United States Patent
Boday et al.

(10) Patent No.: US 10,364,326 B2
(45) Date of Patent: Jul. 30, 2019

(54) POROUS/NANOPOROUS PHT

(71) Applicant: International Business Machines Corporation, Armonk, NY (US)

(72) Inventors: Dylan J. Boday, Tucson, AZ (US); Jeannette M. Garcia, San Leandro, CA (US); James L. Hedrick, Pleasanton, CA (US); Rudy J. Wojtecki, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/675,946

(22) Filed: Aug. 14, 2017

(65) Prior Publication Data

US 2017/0362383 A1   Dec. 21, 2017

Related U.S. Application Data

(62) Division of application No. 14/516,117, filed on Oct. 16, 2014, now Pat. No. 9,777,116.

(51) Int. Cl.

| C08K 7/06 | (2006.01) |
|---|---|
| C08G 73/06 | (2006.01) |
| C08J 9/26 | (2006.01) |
| C08J 9/00 | (2006.01) |
| C08G 73/02 | (2006.01) |

(52) U.S. Cl.
CPC ....... C08G 73/0644 (2013.01); C08G 73/065 (2013.01); C08G 73/0638 (2013.01); C08J 9/0085 (2013.01); C08J 9/26 (2013.01); C08K 7/06 (2013.01); C08G 73/0206 (2013.01); C08J 2201/042 (2013.01); C08J 2205/042 (2013.01); C08J 2361/20 (2013.01); C08J 2379/04 (2013.01)

(58) Field of Classification Search
CPC ................. C08G 73/0638; C08G 73/0206
See application file for complete search history.

(56) References Cited

U.S. PATENT DOCUMENTS

| 2,889,277 | A | 6/1959 | Hughes |
|---|---|---|---|
| 3,340,232 | A | 9/1967 | Smith et al. |
| 3,598,748 | A | 8/1971 | Hirosawa |
| 3,957,742 | A | 5/1976 | Kveton |
| 4,106,904 | A | 8/1978 | Oude Alink et al. |
| 4,224,417 | A | 9/1980 | Hajek et al. |
| 4,225,481 | A | 9/1980 | Wagner |
| 4,246,160 | A | 1/1981 | Wagner et al. |
| 4,301,262 | A | 11/1981 | Wagner et al. |
| 4,877,451 | A | 10/1989 | Winnik et al. |
| 5,112,976 | A | 5/1992 | Clissold et al. |
| 5,399,736 | A | 3/1995 | Friederichs |
| 5,674,377 | A | 10/1997 | Sullivan, III et al. |
| 5,830,243 | A | 11/1998 | Wolak et al. |
| 7,384,434 | B2 | 6/2008 | Malfer et al. |
| 9,777,116 | B2 | 10/2017 | Boday et al. |
| 9,890,248 | B2 | 2/2018 | Boday et al. |
| 2002/0037857 | A1 | 3/2002 | Semple et al. |
| 2010/0005610 | A1 | 1/2010 | Baus et al. |
| 2010/0107476 | A1 | 5/2010 | Cosimbescu |
| 2012/0049308 | A1 | 3/2012 | Nishimura et al. |
| 2012/0164044 | A1 | 6/2012 | Peiffer et al. |
| 2014/0088215 | A1 | 3/2014 | Fricke et al. |
| 2016/0032072 | A1 | 2/2016 | Rhine et al. |
| 2016/0108175 | A1 | 4/2016 | Boday et al. |
| 2016/0108176 | A1 | 4/2016 | Boday et al. |
| 2017/0014186 | A1 | 1/2017 | Chen et al. |
| 2017/0114186 | A1 | 4/2017 | Boday et al. |
| 2017/0166720 | A1 | 6/2017 | Schiraldi et al. |
| 2017/0362838 | A1 | 12/2017 | Freedman et al. |
| 2018/0009948 | A1 | 1/2018 | Boday et al. |

FOREIGN PATENT DOCUMENTS

| CN | 101265255 A | 9/2008 |
|---|---|---|
| EP | 2636697 A1 | 9/2013 |
| GB | 928112 A | 6/1963 |
| GB | 1531578 A | 11/1978 |
| WO | 0166614 A2 | 9/2001 |

(Continued)

OTHER PUBLICATIONS

Translation of WO 0198388. (Year: 2001).*
Translation of WO 0226849. (Year: 2002).*
J. M. Garcia; G. O. Jones; K. Virwani; B. D. McCloskey; D. J. Boday; G. M. ter Huume; H. W. Horn; D. J. Coady; A. M. Bintaleb, A. M. S. Alabdulrahman, Fares Alsewailem, Hamid A. A. Almegren, James L. Hedrick. "Recyclable, Strong Thermosets and Organogels via Paraformaldehyde." Science, 344, 732-735 (Year: 2014).*
Ankush V. Biradara; Tewodros Asefaa. "Nanosized gold-catalyzed selective oxidation of alkyl-substituted benzenes and n-alkanes" Applied Catalysis A: General 435-436 (2012) 19-26 (Year: 2012).
IBM, "List of IBM Patents or Patent Applications Treated As Related," for U.S. Appl. No. 15/675,946 tilted "POROUS/NANOPOROUS PHT," as filed on Aug. 14, 2017.

(Continued)

Primary Examiner — Michael M Dollinger
Assistant Examiner — Christina H. W. Rosebach
(74) Attorney, Agent, or Firm — Patterson + Sheridan, LLP

(57) ABSTRACT

Methods of forming nanoporous materials are described herein that include forming a polymer network with a chemically removable portion. The chemically removable portion may be polycarbonate polymer that is removable on application of heat or exposure to a base, or a polyhexahydrotriazine (PHT) or polyhemiaminal (PHA) polymer that is removable on exposure to an acid. The method generally includes forming a reaction mixture comprising a formaldehyde, a solvent, a primary aromatic diamine, and a diamine having a primary amino group and a secondary amino group, the secondary amino group having a base-reactive substituent, and heating the reaction mixture to a temperature of between about 50 deg C. and about 150 deg C. to form a polymer. Removing any portion of the polymer results in formation of nanoscopic pores as polymer chains are decomposed, leaving pores in the polymer matrix.

19 Claims, No Drawings

(56) References Cited

FOREIGN PATENT DOCUMENTS

| WO | 0198388 A1 | 12/2001 | |
|---|---|---|---|
| WO | WO-0198388 A1 * | 12/2001 | ............ C07D 53/04 |
| WO | 0226849 A1 | 4/2002 | |
| WO | WO-0226849 A1 * | 4/2002 | ............ C08G 12/00 |

OTHER PUBLICATIONS

List of IBM Patents or Patent Applications Treated As Related.
Li, Y.L.; Xie, B.; Zou, L.K.; Zhang, X.I.; Lin, X. "Investigations on synthesis, structural characterization, and new pathway of the butterfly [2Fe2Se] cluster complexes" J. Organometallic Chem 718 (2012) 74-77.
Selva, M.; Fabris, M.; Lucchini, V.; Perosa, A.; Noe, M. The reaction of primary aromatic amines with alkylene carbonates for the selective synthesis of bis-N-(2-hydroxy)alkylanilines; the catalytic effect of phosphonium-based liquids. Org. Biomol. Chem., 2010, 8, 5187-5198.
Henri Ulrich et al., Reaction of Chloromethyl Ether with Primary Amines, May 1961, pp. 1637-1638.
Hemant S. Patel et al., Studies on Synthesis and Characterization of some Novel Aromatic Copolyesters based on s-Triazine, Iranian Polymer Journal, vol. 14, No. 12, 2005, pp. 1090-1098.
Fabian Suriano et al., Functionalized cyclic carbonates: from synthesis and metal-free catalyzed ring-opening polymerization to applications, Polymer Chemistry, The Royal Society of Chemistry, 2011, Received Jul. 6, 2010, Accepted Aug. 13, 2010, pp. 528-533.
John Markoff, Error at IBM Lap Finds New Family of Materials, New York Times, May 15, 2014, 4 pages.
Jeanette M. Garcia et al., Recyclable, Strong Thermosets and Organogels via Paraformaldehyde Condensation with Diamines, Science AAAS, vol. 344, May 16, 2014, pp. 732-735.
D.R. Anderson et al., Thermally resistance polymers containing the s-triazine ring, Journal of Polymer Science Part A-1: Polymer Chemistry, vol. 4, Issue 7, pp. 1689-1702.
T. Okita, Filter method for the determination of trace quantities of amines, mercaptans, and organic sulphides in the atmosphere, Atmospheric Environment (1967), vol. 4, Issue 1, Jan. 1970, pp. 93-102.
Raquel Lebrero et al., Odor abatement in biotrickling filters: Effect of the EBRT on methyl mercaptan and hydrophobic VOCs removal, Bioresource Technology, Special Issue: Innovative Researches on Algal Biomass, vol. 109, Apr. 2012, pp. 38-45.
Elbert, et al. "Conjugate Addition Reactions Combined with Free-Radical Cross-Linking for the Design of Materials for Tissue Engineering," Biomacromolecules 2001, 2, 430-441; Published on Web Mar. 3, 2001.
Farrar, "Reactions of Formaldehyde With Aromatic Amines," J. Appl. Chem, 14, 1964, 389-399.
Geng, et al., "Nanoindentation behavior of ultrathin polymeric films," Polymer 46 (2005) 11768-11772; Available Online Oct. 19, 2005.
Oliver, et al. "Measurement of hardness and elastic modulus by; instrumented indentation: Advances in understanding and; refinements to methodology," J. Mater. Res., vol. 19, No. 1, Jan. 2004, 3-20.
Singh, et al., "Ultrasound mediated Green Synthesis of Hexa-hydro Triazines," J. Mater. Environ. Sci. 2 (4) (2011) 403-406.
Stafford, et al., "A buckling-based metrology for measuring; the elastic moduli of polymeric thin films," Nature Materials_3_Aug. 2004, 545-550;Published online: Jul. 11, 2004.
Wang Yulan and Lu Fengcai, Synthesis and Properties of Polu-1,3,5-Triazines, Polymer Communications, 1984, 7 pages, No. 2, Institute of Chemistry, Academia Sinica, Bejing.
Margit Hiller and Sergey E. Evsyukov, Laser-Engravable Hexahydrotriazine Palmer Networks, Published Online, Aug. 16, 2002.

* cited by examiner

POROUS/NANOPOROUS PHT

CROSS-REFERENCE TO RELATED APPLICATIONS

This application is a divisional of co-pending U.S. patent application Ser. No. 14/516,117, filed Oct. 16, 2014 and entitled "POROUS/NANOPOROUS PHT", which is herein incorporated by reference in its entirety.

BACKGROUND

Lightweight, extraordinarily strong materials enable technology that will significantly impact advanced manufacturing and product designs in areas such as aerospace, transportation and renewable energy applications. High strength-to-weight-ratio materials for parts manufacturing in transportation will significantly reduce fuel consumption, while still complying with current safety standard levels. Typical industrial high-strength composites are comprised of carbon fibers dispersed in a matrix polymer. Progress in nanofiber processing, including heteroatom doping, nanofiber growth and assembly methodologies, spinning technologies (wet and dry), centrifugal (forced) methods, electrospinning, fiber/fabric/composite processing using nanoparticle inclusive pyrolysis (PAN hollow carbon fibers) and MEMS weaving of nanofibers have enabled many desirable mechanical and processing properties. A significant amount of research in the area of high strength and low-weight composites has focused on the fiber reinforcements and the interfaces within the composite. In this regard, an important and tunable parameter is the matrix resin used to disperse the carbon fibers. Effective resins require thermal stability, high dimensional stability and modulus, tough, ductile mechanical properties, solvent resistance and adhesion with the filler. Identifying polymer resins that meet these essential criteria are often considered one of the main bottlenecks of advanced manufacturing. Hybrid polymers possessing both functionalities, rigidity and solution-solubility, allows access to resins that meet these requirements through careful selection of the polymer composition.

Incorporation of porous fibers into a polymer matrix is an ideal way to reduce the weight of a composite structure. However, the ability to impart porosity to the matrix material would be highly desirable as well. For such applications, the porosity should be significantly smaller that the fibers that reinforce the material so that the pores do not form defects or concentrate stress, which might lead to catastrophic failure. Given these criteria, traditional blow molding strategies are not applicable.

There is a need for methods of making strong nanoporous materials that may be used as part of a fiber matrix.

SUMMARY

Embodiments described herein relate to methods of making porous and nanoporous polyhemiaminal and polyhexahydrotriazine polymers and networks, and more specifically to preparing polyhemiaminals and polyhexahydrotriazines having degradable components incorporated at the molecular level. Such porous materials are typically thermally stable polymer materials that include a porous carbon-nitrogen polymer with average pore size less than about 100 nm and density less than about 1.5 g/cm$^3$. The carbon-nitrogen polymer may be a polyhexahydrotriazine or a polyhemiaminal.

In some aspects, a polymeric material is described that includes a plurality of hexahydrotriazine units, hemiaminal units, or both bonded together by a first linkage and a second linkage, wherein the first linkage is thermally stable and resistant to bases and the second linkage is thermally degradable and degradable by a base. The first linkage may be a dianiline linkage, and the second linkage may be a polycarbonate or polyester linkage. Such a material may be made porous by chemically removing the second linkage.

In other aspects, a method of making a material is described, the method including forming a reaction mixture comprising a formaldehyde, a solvent, a primary aromatic diamine, and a diamine having a primary amino group and a secondary amino group, the secondary amino group having a base-reactive substituent; and heating the reaction mixture to a temperature of between about 50 deg C. and about 150 deg C. to form a polymer. The polymer may be made nanoporous by further heating the polymer to a temperature between about 200 deg C. and about 300 deg C., or by exposing the polymer to a base, to form a porous polymer.

An article made of the porous and nanoporous materials described herein may be made of a material that includes a porous polymer having a plurality of hexahydrotriazine units, hemiaminal units, or both.

DETAILED DESCRIPTION

Methods of forming nanoporous materials are described herein that include forming a polymer network with a chemically removable portion. The chemically removable portion may be polycarbonate polymer that is removable on application of heat or exposure to a base, or a polyhexahydrotriazine (PHT) or polyhemiaminal (PHA) polymer that is removable on exposure to an acid. The method generally includes forming a reaction mixture comprising a formaldehyde, a solvent, a primary aromatic diamine, and a diamine having a primary amino group and a secondary amino group, the secondary amino group having a base-reactive substituent, and heating the reaction mixture to a temperature of between about 50 deg C. and about 150 deg C. to form a polymer. The polymer typically has a first portion that is thermally stable, and a second portion that is thermally degradable or degradable on exposure to a base. The first portion may additionally be degradable on exposure to acid. Degrading any portion of the polymer results in formation of nanoscopic pores as polymer chains are decomposed, leaving pores in the polymer matrix.

The porogen portion of the polymer may be a polycarbonate polymer. A polycarbonate block may be grafted onto another polymer block that does not degrade under conditions similar to those that degrade a polycarbonate polymer. Polycarbonates generally hydrolyze or solvolyze at elevated temperatures and under basic conditions. Thus, a polymer that has a thermally stable, base resistant, portion and a polycarbonate portion can be formed into a network and then exposed to elevated temperature and/or basic conditions to remove the polycarbonate portion and form pores. A nanoporous polymer network or foam is formed having pores substantially similar in size to the polymer fragments removed by pore formation. Polyesters and polyacrylates may also be degraded under similar conditions, and a block polymer network with polyester, polyacrylate, and/or polycarbonate blocks attached to thermally stable, base stable, polymer blocks may be used to form a nanoporous foam. The porogen portion of the polymer may also be an acid hydrolyzable portion. PHT's and PHA's may be hydrolyzed at pH<1.

Generally, the polymers referred to herein have the structure:

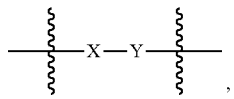

where X has the structure

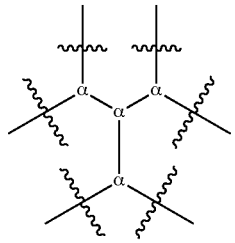

and Y has the structure

The symbols α and β represent polymer portions with different reactivities. For example, α may be a first portion that is thermally stable and degradable by, or reactive with, acid in suitable pH conditions, and β may be a second portion that is thermally degradable and/or degradable by, or reactive with, bases in suitable pH conditions. Such polymers may be used to form nanoporous materials by forming a polymer network of the first and second portions in any desired amounts, and then applying a pore formation environment to the first portion or the second portion. Here, the first portion α is shown as a trivalent group, but α may have any effective valence from 3 to 6, as further described below. The nanoporous polymers referred to herein may be carbon-nitrogen polymers (with the usual hydrogen atoms), which prior to pore formation may also contain oxygen. After pore formation, the resulting porous polymer network may be a thermally stable carbon-nitrogen polymer.

The first portion α may be a PHA or PHT polymer group. The PHA and PHT polymers mentioned above are thermally stable and base resistant. A PHT is a polymer that includes a plurality of trivalent hexahydrotriazine (HT) groups having the structure

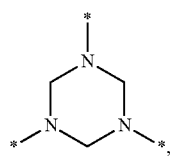

covalently linked to a plurality of bridging groups

wherein y' is 2 or 3, and K' is a divalent or trivalent radical. In this disclosure, starred bonds represent attachment points to other portions of the chemical structure. Each starred bond of a given HT group is covalently linked to a respective one of the bridging groups. Additionally, each starred bond of a given bridging group is covalently linked to a respective one of the HT groups. A PHA is a polymer that includes a plurality of trivalent hemiaminal (HA) groups having the structure

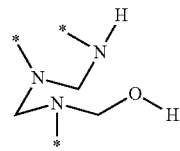

covalently linked to a plurality of the bridging groups of formula (2).

In one example, a PHA can be represented by the structure

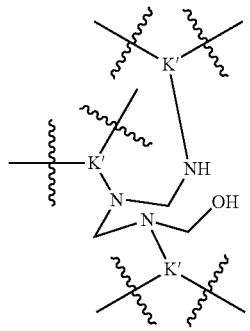

where the bridging groups K' are trivalent (y'=3 in formula 2). In this example, the first portion α is a hexavalent PHA. Similarly, a PHT can be represented by the structure

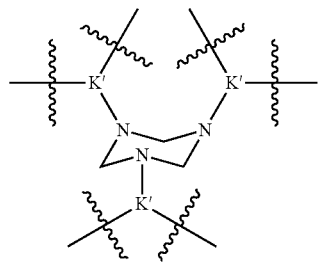

and in such an example the first portion α is a hexavalent PHT. In the case of divalent bridging groups K' (y'=2 in formula 2), the first portion α may have either of the following structures

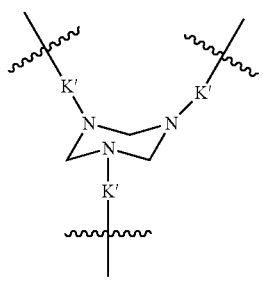
,

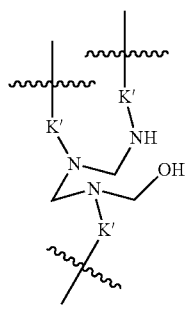

where the structure of formula (6) is a PHT structure and the structure of formula (7) is a PHA structure. The first portions α of formulas (6) and (7) are trivalent. Using a mixture of divalent and trivalent bridging groups K', the first portion α may have valence from 3 to 6.

Trivalent bridging groups K' that may be part of a porous network include the following structures:

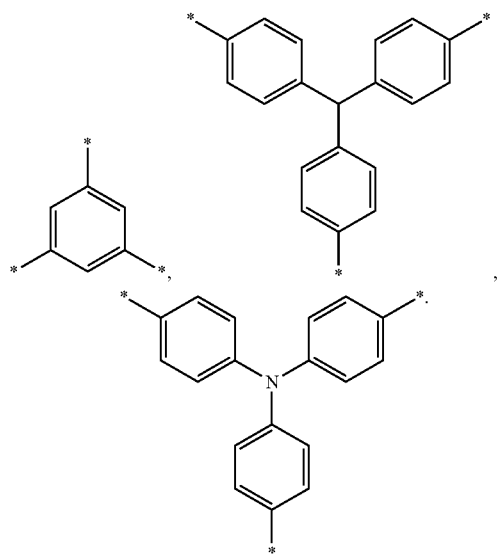
, and

These structures may be included in the network by adding primary amine-terminated molecules containing these structures to the reaction mixture with other primary amines and diamines, and formaldehyde. Such structures may be included to increase non-porogen network bonding such that the reduction in density of the polymer upon exposure to a pore-building process is controlled.

The second portion β may have valence from 1 to 3, and may be a polymer that is partially or fully degradable at elevated temperatures or under basic conditions. The second portion β may be a linear or quasi-linear polymer group, or the second portion β may have a cyclic center such as an HA or HT center. The second portion β may be a monovalent substituent group, a divalent linking group, or a trivalent network group. The second portion β may have a degradable sub-portion and a non-degradable sub-portion, or a sub-portion that is degradable under conditions similar to the first portion α and a sub-portion that is degradable under different conditions, such as basic conditions or acidic conditions with pH>1.

Examples of a monovalent substituent group that may be used for the second portion β are polycarbonate diamines having the structure of formula (8)

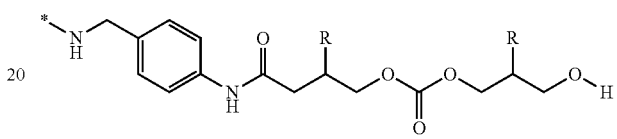

wherein, in each instance, R is a substituent that may be included to adjust the size of the degraded portion, and thus of the pore formed by degrading the second portion β. R may be a hydrocarbyl chain or a low molecular weight polyolefin polymer substituent, or another polymer unit that has no pore formation properties or pore formation properties similar to the main chain of the second portion β, for example a polyester group. The monovalent substituent group above may be made by reacting propylene carbonate, which may be substituted at the para location, with paraphenylenedianiline, to form a diamine having a primary amino group and a secondary amino group, the secondary amino group having a base-reactive substituent, according to formula (9):

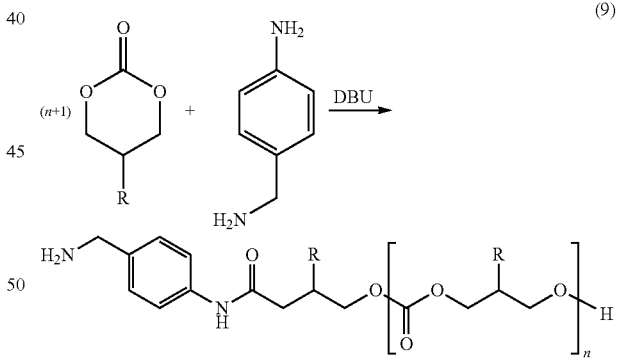

where DBU is diazobicycloundecane. Formula (9) shows a reaction featuring a substituted 1,3-propylene carbonate, also known as trimethylene carbonate. Other polymers that may be used as the monovalent substituent include polyesters, polyvinylethers, polyacrylates, polyacetals, polyaminals, polythiacetals, polyphosphates, and aliphatic polysulfones. In general, the monovalent substituent may be a polymer having a glass transition temperature, $T_g$, of at least about 40° C.

The second portion β may be a divalent linkage with a PHT or PHA core and a monovalent substituent with thermal or base-sensitive pore formation. The second portion β may also be a divalent linkage with a PHT or PHA core, a divalent substituent with thermal or base-sensitive pore formation, and a monovalent diluent group. A divalent linkage with PHT and PHA cores, respectively, and monovalent substituents have the general structures

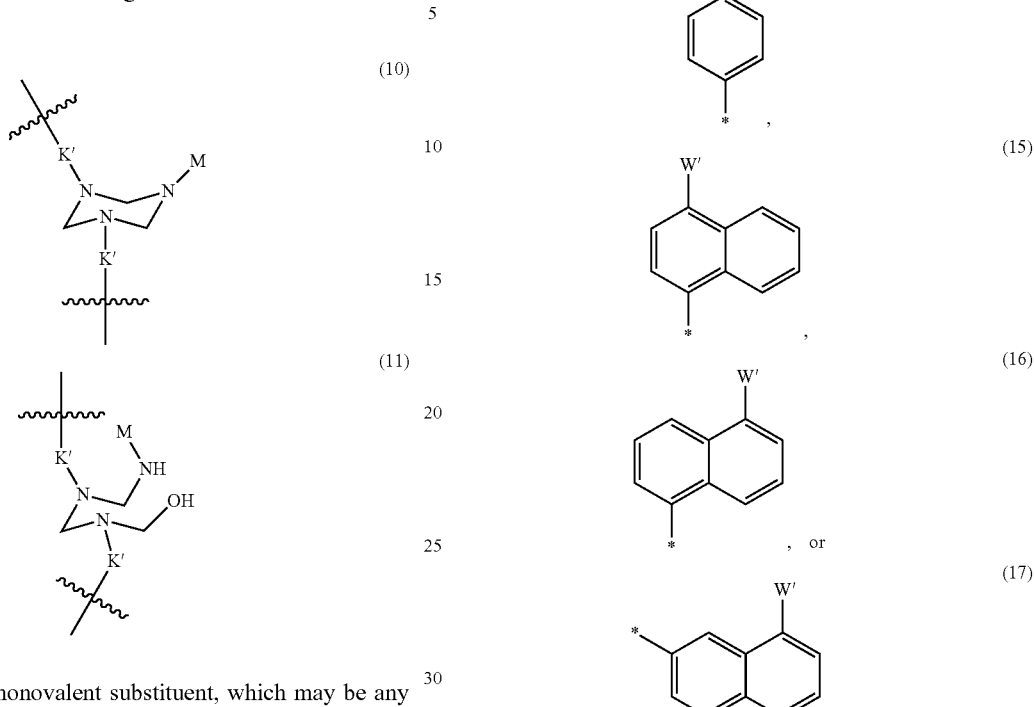

where m is the monovalent substituent, which may be any convenient polymer that may be functionalized with a primary amine group. The polycarbonate polymer variety described above, and the other polymers listed above, may be used. A divalent linkage with PHT and PHA cores, respectively, and divalent substituents have the general structures wherein M is a monovalent substituent that may be unreactive, acid degradable, base degradable, and/or thermally degradable, and Q is a divalent bridging group.

Other monovalent substituents that may be used as the monovalent substituent M include groups having the structures of the following formula:

wherein W' is a monovalent radical selected from the group consisting of *—N(R$^1$)(R$^2$), *—OR$^3$, —SR$^4$, wherein R$^1$, R$^2$, R$^3$, and R$^4$ are independent monovalent radicals comprising at least 1 carbon. The starred bond is linked to a nitrogen of a hemiaminal group or a hexahydrotriazine group. Non-limiting exemplary monovalent groups having the structures of formulas 14-17 include:

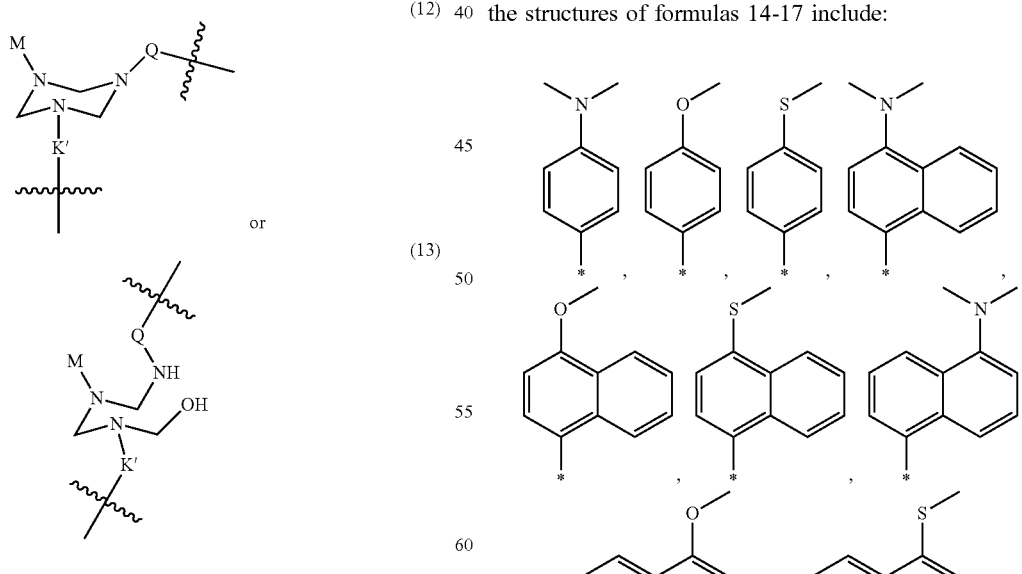

wherein the starred bond is linked to a nitrogen of a hemiaminal group or a hexahydrotriazine group. Monovalent groups can be used singularly or in combination.

Non-limiting exemplary monomers that give rise to monovalent groups in a porous network include N,N-dimethyl-p-phenylenediamine (DPD), p-methoxyaniline (MOA), p-(methylthio)aniline (MTA), N,N-dimethyl-1,5-diaminonaphthalene (15DMN), N,N-dimethyl-1,4-diaminonaphthalene (14DMN), and N,N-dimethylbenzidene (DMB), which have the following structures:

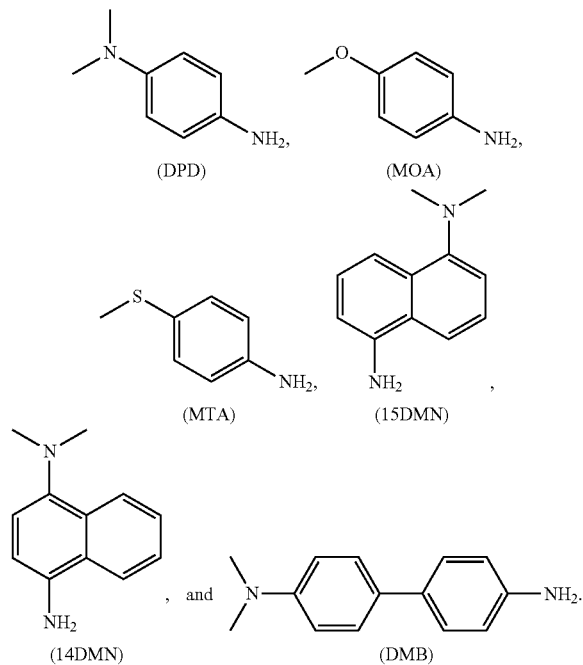

Some embodiments described herein are polymer networks having a PHA or PHT core, or a mixture thereof. Polymers having a PHA or PHT core are generally made by reacting a primary amine, or mixture thereof, with formaldehyde or oligomers thereof. The amino group of the primary amine reacts with the aldehyde to form a cyclic trimer that is a hydrogenated triazine. If a primary diamine is included, the diamine may cyclotrimerize at both ends to form the PHA or PHT network. In one example, oxydianiline is mixed with paraformaldehyde and heated to about 50° C. to form a PHA network. Further heating up to 200° C. forms a PHT network. The PHA network may be non-covalently bonded with water through hydrogen bonding, or with another solvent. A PHA complex with water has the general structure of formula (18)

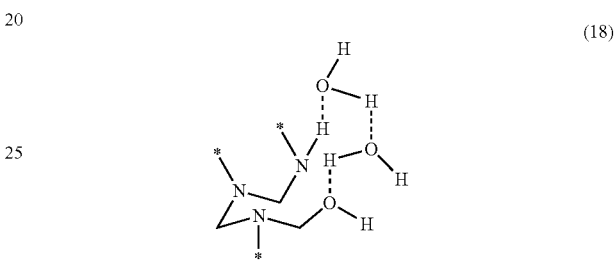

where the stars represent bonds to other atoms in the network, as described above. Further heating of such a network eliminates water to form the PHT.

In one example, a PHT network formed with a polycarbonate degradable portion may have the structure of formula (19)

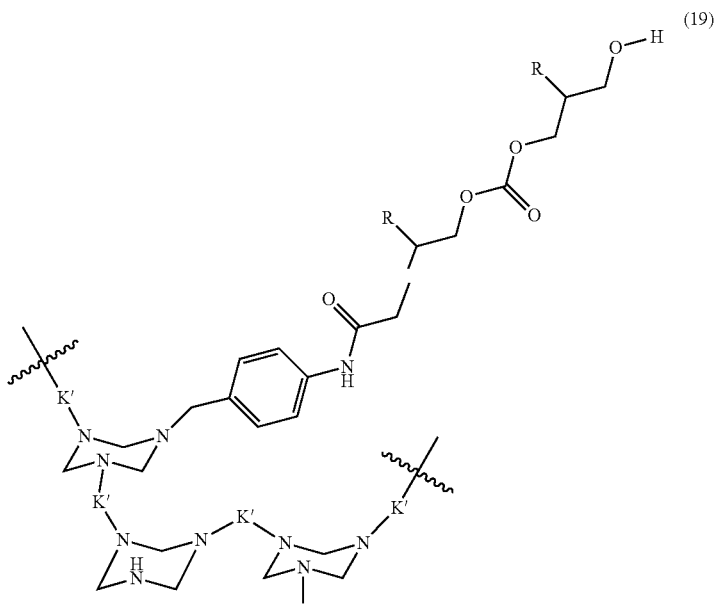

-continued

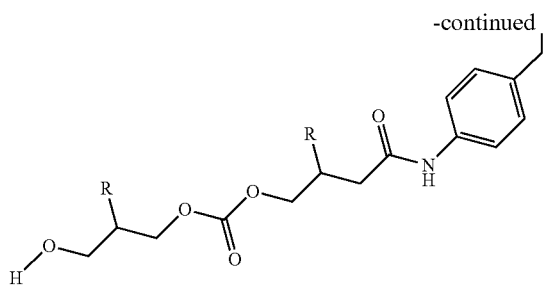

where the network has no particular conformational structure. The structure of formula (19) includes some PHT groups that have only linkages to other PHT groups via K' groups, while other PHT groups have monovalent polycarbonate substituents, which may be any of the polymer substituents described above. The structure of formula (19), after thermal pore formation or exposure to basic conditions, yields a porous PHT network having voids where formerly there were polycarbonate groups covalently linked to the network. The porous PHT network may generally have the structure of formula (20)

(20)

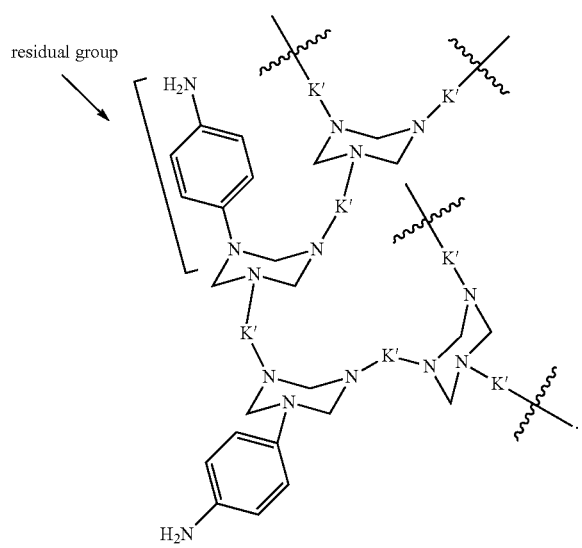

It should be noted that the number of residual groups in formula (20) remaining from pore formation by degradation of the polycarbonate portions, in the example above, or residual groups from pore formation using any particular porogen portion, is dependent on the proportion of porogen portions in the network prior to pore formation. The porosity of the resulting network is dependent on the size of the porogen portions included in the network prior to pore formation and on the proportion of porogen portions in the network. The porosity of the network may be practically limited by the strength requirements of the material. If porosity is allowed to become too high, strength of the material may suffer. For most embodiments, porosity will be limited to no more than about 60%. Porosity, in this disclosure, means the volume of void space in a material divided by the total bulk volume of the material. The size of the pores is similar to the size of the molecular fragments removed during pore formation. In most cases, the pores are 20-100 nm in dimension. The resulting porous network may have a bulk density less than about 1.5 g/cm$^3$, such as between about 1.0 and 1.5 g/cm$^3$, for example about 1.36 g/cm$^3$.

Divalent bridging groups Q usable for the networks described herein may have at least one 6-carbon aromatic ring. A category of such divalent bridging groups Q may be represented by the structure of formula (21)

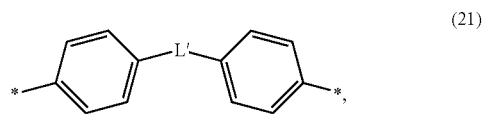

(21)

wherein L' is a divalent linking group selected from the group consisting of *—O—*, *—S—*, *—N(R')—*, *—N(H)—*, *—R"—*, and combinations thereof, wherein R' and R" independently comprise at least 1 carbon. In an embodiment, R' and R" are independently selected from the group consisting of methyl, ethyl, propyl, isopropyl, phenyl, and combinations thereof. Other L' groups include methylene (*—CH$_2$—*), isopropylidenyl (*—C(Me)$_2$-*), and fluorenylidenyl:

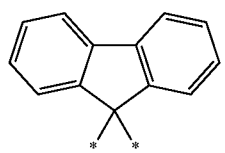

An exemplary structure of a PHT network containing a porogen portion and bridging groups of formula (21) may have the structure of formula (22)

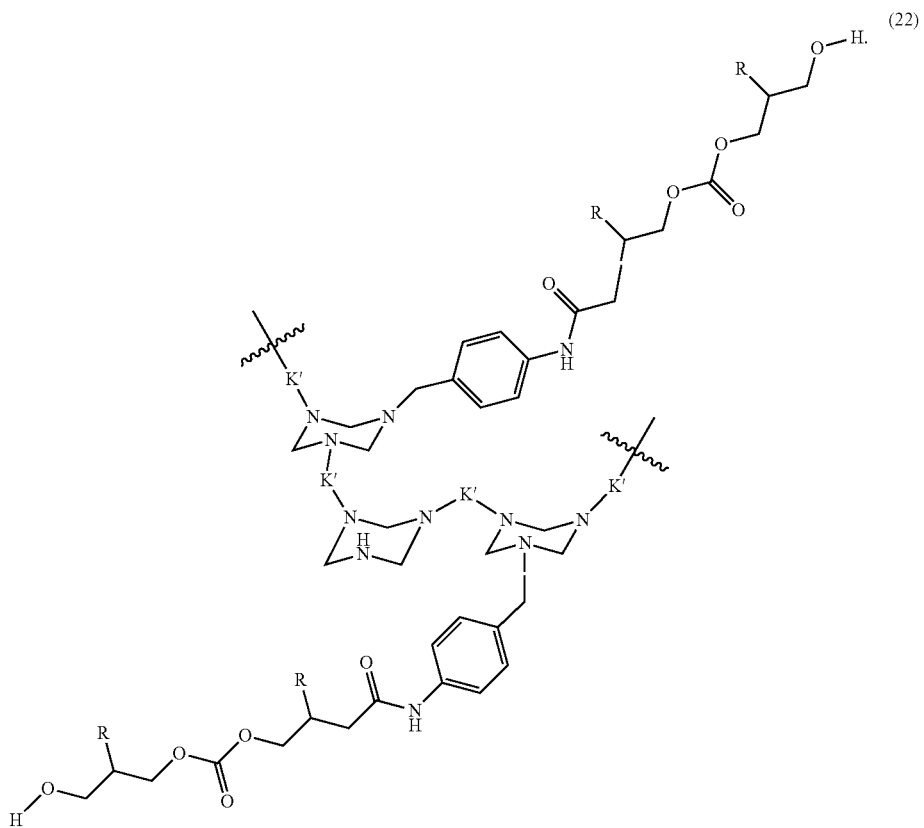

After pore formation, the structure of formula (22) will look like the structure of formula (20) with the bridging groups of formula (21) at some locations and the residual groups of formula (20) in other locations, and pores in the network. An exemplary structure of a PHA network containing a porogen portion and bridging groups of formula (21) with hydrogen bonding may have the structure of formula (23)

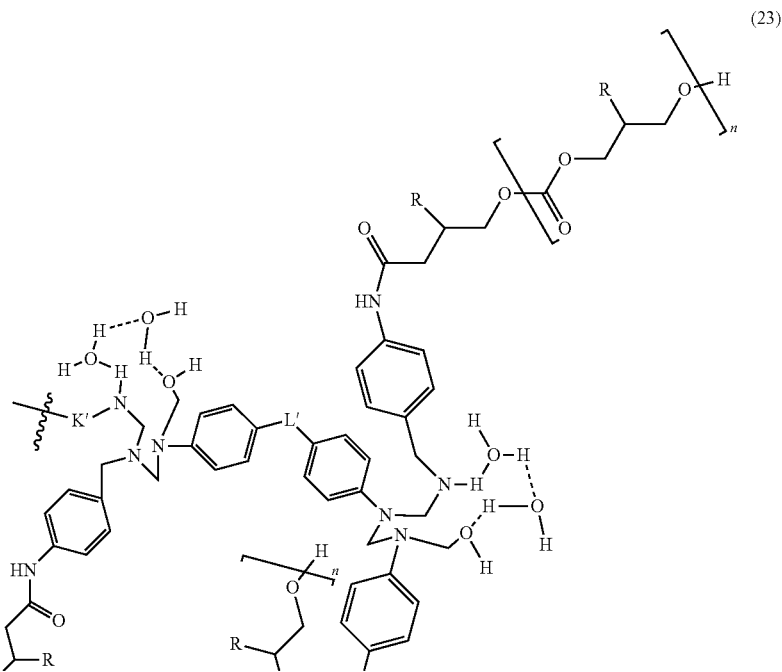

-continued

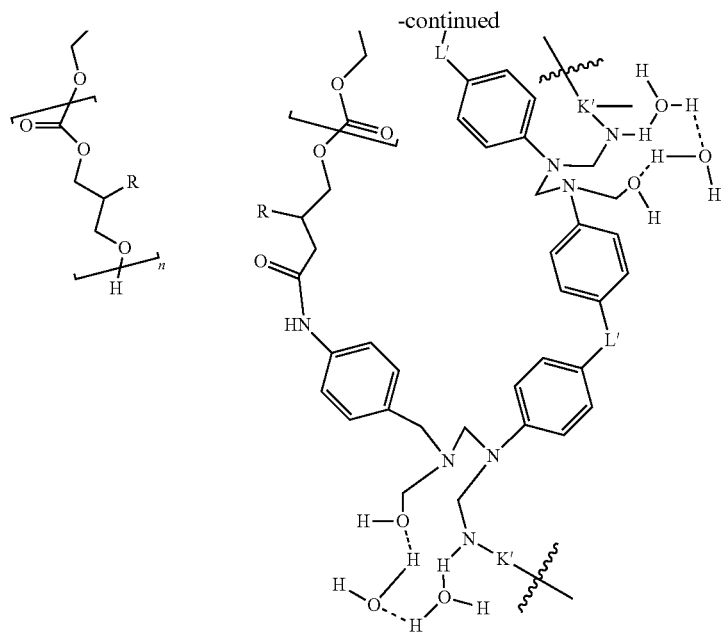

After pore formation, the formula of (23) will likewise have pores and residual groups, in this case aniline groups, where the polycarbonate chains were removed, as in formula (20).

Other divalent bridging groups Q that may be used include:

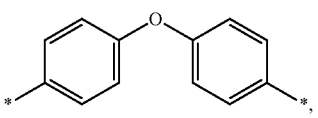

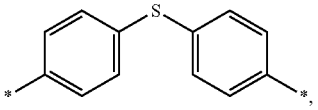

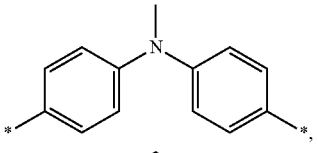

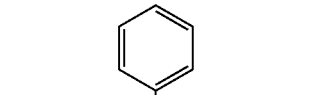

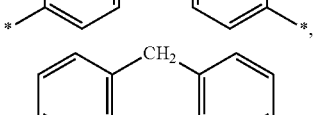

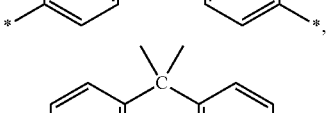

-continued

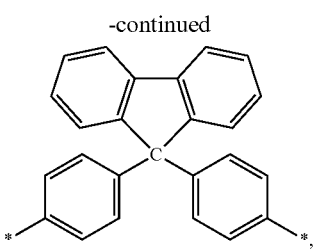

and combinations thereof.

Non-limiting example of monomers comprising two primary aromatic amine groups that may be used to include the divalent groups described above include 4,4'-oxydianiline (ODA), 4,4'-methylenedianiline (MDA), 4,4'-(9-fluorenylidene)dianiline (FDA), p-phenylenediamine (PD), 1,5-diaminonaphthalene (15DAN), 1,4-diaminonaphthalene (14DAN), and benzidene, which have the following structures:

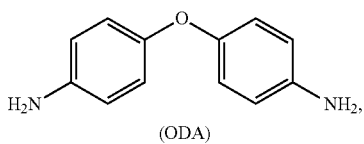
(ODA)

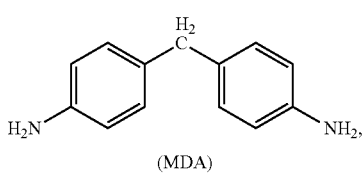
(MDA)

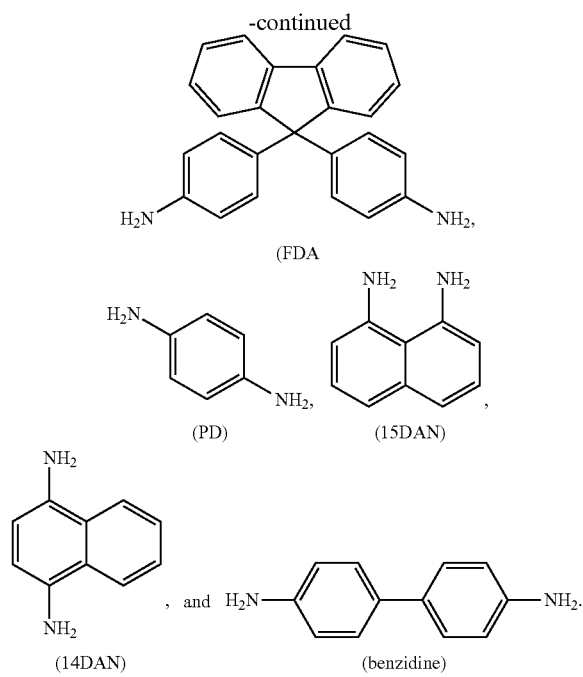

(FDA)

(PD)

(15DAN)

(14DAN)

(benzidine)

The divalent bridging groups Q may include other polymer porogen groups. Polymers such as polycarbonates, polyesters, polyvinylethers, polyacrylates, polyacetals, polyaminals, polythioacetals, polyphosphates, and aliphatic polysulfones may be used with appropriate degradation chemistries, as polymer porogen groups. The polymer porogen groups may be added by obtaining a diamine terminated porogen polymer and reacting the diamine terminated porogen polymer with formaldehyde or paraformaldehyde with other amines and diamines. The diamine terminated polymers and oligomers referred to above are commercially available, or may be readily synthesized through well-known reaction pathways.

It should be noted that an HT or HA center in a polymer molecule may have 1 or 2 removable polymer bridging (i.e. divalent) groups Q. The HT centers of a polymer molecule may have different numbers of removable polymer bridging groups. One HT center of a polymer molecule may have 1 removable polymer bridging group Q, while another HT center has 2 removable polymer bridging groups Q. In the PHA and PHT materials described herein, a ratio of number of L' groups to number of Q groups may be at least about 30.

The PHA and PHT materials of formulas (22) and (23), and PHA and PHT materials including removable divalent polymer groups, may have more than one type of removable polymer group. A first removable polymer group may be a first polymer while a second removable polymer group is a second polymer different from the first polymer. Each of the first and second polymers may be of the same type or a different type, and may be any of the polymer types listed above. For example, each of the removable polymer groups in a PHA or PHT material may be independently selected from a polycarbonate chain, a polyester chain, a polyvinylether chain, a polyacrylate chain, a polyacetal chain, a polyaminal chain, a polythioacetal chain, a polyphosphate chain, or an aliphatic polysulfone chain.

In some embodiments, the first polymer and the second polymer may be the same polymer, but may have different molecular weight moments $M_1$. Molecular weight of a polymer mixture is usually expressed in terms of a moment of the molecular weight distribution of the polymer mixture, defined as $$M_z = \frac{\sum m_i^z n_i}{\sum m_i^{z-1} n_i},$$

where $m_i$ is the molecular weight of the ith type of polymer molecule in the mixture, and $n_i$ is the number of molecules of the ith type in the mixture. $M_1$ is also commonly referred to as $M_n$, the "number average molecular weight". $M_2$ is also commonly referred to as $M_w$, the "weight average molecular weight". The polymer mixtures used to obtain divalent polymer bridging groups in the materials described herein may have $M_1$ of at least about 1000 g/mol.

Molecular weight distribution of a polymer mixture may be indicated by a polydispersity ratio $P_z$, which may be defined as:

$$P_z = \frac{M_{z+1}}{M_z},$$

where $M_z$ is defined above. The removable polymer groups used in embodiments described herein typically come from polymer molecule mixtures having a polydispersity ratio $P_1$ of about 1-3, for example about 2. The first polymer and the second polymer may have different polydispersity ratios, as well. Thus, a polymer diamine mixture having uniform composition but bimodal (or multimodal) molecular weight distribution may be used to form a PHT or a PHA with removable groups for forming a nanoporous network. In such embodiments, the relative quantities of the molecular weight modes may be selected by varying the amounts of the first and second polymers. It should be noted that any number of different polymer diamines may be used in the polymer diamine mixture.

A method of preparing a polyhemiaminal (PHA) having divalent bridging groups, including removable groups, comprises forming a first mixture comprising i) a monomer comprising two or more primary aromatic amine groups, ii) a polymer amine and/or diamine, or mixture thereof, having a polymer portion that is removable by thermolysis, hydrolysis, or solvolysis, iii) an optional monovalent monomer comprising one aromatic primary amine group, iv) paraformaldehyde, and v) a solvent. The first mixture is then preferably heated at a temperature of about 20° C. to about 120° C. for about 1 minute to about 24 hours, thereby forming a second mixture comprising the PHA. In an embodiment, the monomer comprises two primary aromatic amine groups. In another embodiment, the polymer amine or diamine is a reaction product of propylene carbonate and paraphenylene dianiline.

The mole ratio of paraformaldehyde:total moles of primary amine groups (e.g., diamine monomer plus polymer amine and diamine plus optional monoamine monomer) is preferably about 1:1 to about 1.25:1, based on one mole of paraformaldehyde equal to 30 grams.

Usable solvents include dipolar aprotic solvents such as, for example, N-methyl-2-pyrrolidone (NMP), dimethylsulfoxide (DMSO), N,N-dimethylformamide (DMF), N,N-dimethylacetamide (DMA), Propylene carbonate (PC), and propylene glycol methyl ether acetate (PGMEA). Most preferably, the solvent is NMP.

A method of preparing a polyhexahydrotriazine (PHT) having divalent bridging groups, including removable groups, comprises forming a first mixture comprising i) a monomer comprising two aromatic primary amine groups, ii) a polymer amine and/or diamine, or mixture thereof, having a polymer portion that is removable by thermolysis, hydrolysis, or solvolysis, iii) an optional monovalent monomer comprising one aromatic primary amine group, iv) paraformaldehyde, and v) a solvent, and heating the first mixture at a temperature of at least 150° C., preferably about 165° C. to about 280° C., thereby forming a second mixture comprising a polyhexahydrotriazine. The heating time at any of the above temperatures can be for about 1 minute to about 24 hours.

Alternatively, the PHT can be prepared by heating the solution comprising the PHA at a temperature of at least 150° C., preferably about 165° C. to about 280° C. even more preferably at about 180° C. to about 220° C., and most preferably at about 200° C. for about 1 minute to about 24 hours.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. When a range is used to express a possible value using two numerical limits X and Y (e.g., a concentration of X ppm to Y ppm), unless otherwise stated the value can be X, Y, or any number between X and Y.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the invention.

What is claimed is:

1. A polymeric material comprising a plurality of hexahydrotriazine units, hemiaminal units, or both bonded together by a first linkage and a second linkage, wherein the first linkage is thermally stable and resistant to bases and the second linkage is thermally degradable and degradable by a base.

2. The polymeric material of claim 1, wherein the second linkage is a polycarbonate or polyester linkage.

3. The polymeric material of claim 2, wherein the first linkage is a dianiline linkage.

4. The polymeric material of claim 1, wherein each hexahydrotriazine unit has the general structure

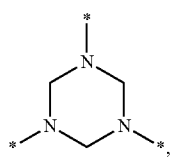

each hemiaminal unit has the general structure

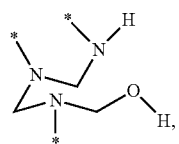

the first linkage has the general structure

wherein y' is 2 or 3, and K' is a divalent or trivalent radical, and the second linkage has the general structure

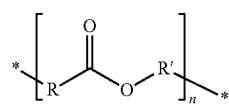

wherein R is a substituted or unsubstituted alkyl, aryl, or alkoxy group having 1 to 50 carbon atoms, R' is a substituted or unsubstituted alkyl or aryl group having 1 to 50 carbon atoms, and n is 1 to 1,000.

5. The polymeric material of claim 1, further comprising a substituent having the general structure

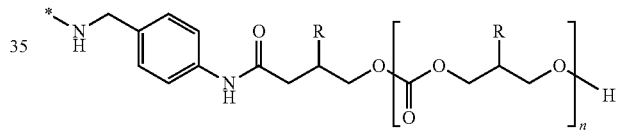

wherein, in each instance, R is a polyolefin or polyester.

6. The polymeric material of claim 1, wherein the polymeric material has a bulk density between 1.0 and 1.5 g/cm³.

7. The polymeric material of claim 1, wherein the polymeric material has pores 20-100 nm in dimension.

8. A polymeric material comprising a plurality of hexahydrotriazine units, hemiaminal units, or both bonded together by a first linkage and a second linkage, wherein the first linkage is a dianiline linkage that is thermally stable and resistant to bases and the second linkage is a polymer linkage that is thermally degradable and degradable by a base.

9. The polymeric material of claim 8, wherein the dianiline linkage has the general structure

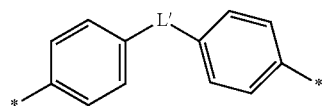

wherein L' is a divalent linking group selected from the group consisting of —O—, —S—, —N(R')—, —N(H)—, —R"—, and combinations thereof, wherein R' and R" independently comprise at least 1 carbon.

10. The polymeric material of claim 8, wherein the polymer material has the general structure

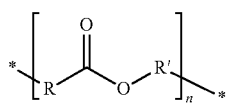

wherein R is a substituted or unsubstituted alkyl, aryl, or alkoxy group having 1 to 50 carbon atoms, R' is a substituted or unsubstituted alkyl or aryl group having 1 to 50 carbon atoms, and n is 1 to 1,000.

11. The polymeric material of claim 9, wherein each hexahydrotriazine unit has the general structure

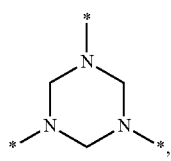

and each hemiaminal unit has the general structure

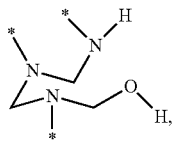

12. The polymeric material of claim 10, wherein each hexahydrotriazine unit has the general structure

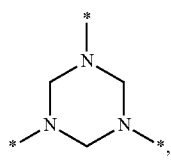

and each hemiaminal unit has the general structure

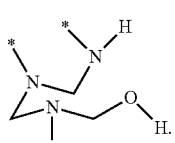

13. The polymeric material of claim 8, further comprising a substituent having the general structure

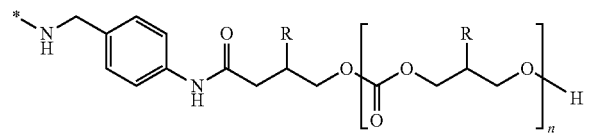

wherein, in each instance, R is a polyolefin or polyester.

14. The polymeric material of claim 13, wherein the polymeric material has a bulk density between 1.0 and 1.5 g/cm$^3$.

15. The polymeric material of claim 13, wherein the polymeric material has pores 20-100 nm in dimension.

16. A polymeric material comprising a plurality of hexahydrotriazine units, hemiaminal units, or both bonded together by a first linkage and a second linkage, wherein the first linkage is a dianiline linkage that is thermally stable and resistant to bases, and has the general structure

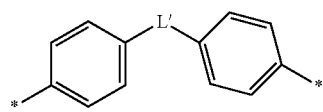

wherein L' is a divalent linking group selected from the group consisting of —O—, —S—, —N(R')—, —N(H)—, —R"—, and combinations thereof, wherein R' and R" independently comprise at least 1 carbon, and the second linkage is a polymer linkage that is thermally degradable and degradable by a base, and has a general structure

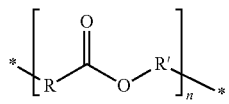

wherein R is a substituted or unsubstituted alkyl, aryl, or alkoxy group having 1 to 50 carbon atoms, R' is a substituted or unsubstituted alkyl or aryl group having 1 to 50 carbon atoms, and n is 1 to 1,000.

17. The polymeric material of claim 16, further comprising a substituent having the general structure

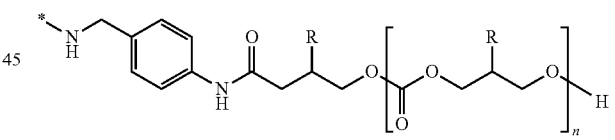

wherein, in each instance, R is a polyolefin or polyester.

18. The polymeric material of claim 16, wherein the polymeric material has a bulk density between 1.0 and 1.5 g/cm$^3$.

19. The polymeric material of claim 16, wherein the polymeric material has pores 20-100 nm in dimension.

* * * * *